US012784192B2

(12) United States Patent
Amakawa et al.

(10) Patent No.: US 12,784,192 B2
(45) Date of Patent: Nov. 3, 2026

(54) SLIDE NUMBER ESTIMATION APPARATUS, CONTROL METHOD, AND NON-TRANSITORY COMPUTER READABLE MEDIUM

(71) Applicants: NEC CORPORATION, Tokyo (JP); NATIONAL UNIVERSITY CORPORATION HOKKAIDO UNIVERSITY, Sapporo (JP)

(72) Inventors: Ayaka Amakawa, Tokyo (JP); Maki Sano, Tokyo (JP); Kanako Hatanaka, Hokkaido (JP); Yutaka Hatanaka, Hokkaido (JP)

(73) Assignees: NEC CORPORATION, Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 479 days.

(21) Appl. No.: 18/283,698

(22) PCT Filed: Feb. 1, 2022

(86) PCT No.: PCT/JP2022/003854
§ 371 (c)(1),
(2) Date: Sep. 22, 2023

(87) PCT Pub. No.: WO2022/201881
PCT Pub. Date: Sep. 29, 2022

(65) Prior Publication Data

US 2024/0161280 A1 May 16, 2024

(30) Foreign Application Priority Data

Mar. 25, 2021 (JP) ................................. 2021-051351

(51) Int. Cl.
*G06T 7/00* (2017.01)

(52) U.S. Cl.
CPC .. *G06T 7/0012* (2013.01); *G06T 2207/30024* (2013.01); *G06T 2207/30096* (2013.01); *G06T 2207/30242* (2013.01)

(58) Field of Classification Search
CPC ......... G06T 7/0012; G06T 2207/30024; G06T 2207/30096; G01N 33/48
See application file for complete search history.

(56) References Cited

U.S. PATENT DOCUMENTS

2021/0166785 A1* 6/2021 Yip ........................... G06T 1/20

FOREIGN PATENT DOCUMENTS

JP 2006-523100 A 10/2006
JP 2013-246187 A 12/2013
(Continued)

OTHER PUBLICATIONS

Yutaka Hatanaka et al., "Guidelines for Handling Genomic Diagnostic Pathology Tissue Specimens", The Japanese Society of Pathology, Mar. 1, 2018, 52 pages, Internet <URL: http://pathology.or.jp/genome_med/pdf/textbook.pdf>.
(Continued)

*Primary Examiner* — John R Wallace
(74) *Attorney, Agent, or Firm* — Sughrue Mion, PLLC

(57) ABSTRACT

A slide number estimation apparatus (2000) acquires a slide image (30). The slide image (30) an image of a specimen slide (20) obtained from a tissue piece (10) of a subject. The slide number estimation apparatus (2000) estimates the number of tumor cells included in a region of interest (22) of the specimen slide (20) corresponding to the obtained slide image (30) using the slide image (30). The slide number estimation apparatus (2000) estimates the number of the specimen slides (20) to be obtained from the tissue piece (10) for conducting a predetermined test based on the estimated number of tumor cells.

14 Claims, 8 Drawing Sheets

(56) References Cited

FOREIGN PATENT DOCUMENTS

| | | | |
|---|---|---|---|
| JP | 2015-123047 | A | 7/2015 |
| JP | 2015-125098 | A | 7/2015 |
| JP | 2016-049078 | A | 4/2016 |
| JP | 2017-212937 | A | 12/2017 |
| JP | 2017-212938 | A | 12/2017 |

OTHER PUBLICATIONS

International Search Report for PCT/JP2022/003854, dated Apr. 26, 2022.

* cited by examiner

10

TISSUE PIECE
20-1
22-1
20-n
22-n
SPECIMEN SLIDE
SPECIMEN SLIDE
30
32
SLIDE IMAGE
2000
SLIDE NUMBER ESTIMATION APPARATUS
ESTIMATE NUMBER OF TUMOR CELLS INCLUDED IN REGION OF INTEREST 22 OF SPECIMEN SLIDE 20 CORRESPONDING TO SLIDE IMAGE 30
ESTIMATE NUMBER OF SPECIMEN SLIDES 20 REQUIRED FOR TARGET TEST BASED ON ESTIMATED NUMBER OF TUMOR CELLS

SLIDE NUMBER ESTIMATION APPARATUS, CONTROL METHOD, AND NON-TRANSITORY COMPUTER READABLE MEDIUM

CROSS REFERENCE TO RELATED APPLICATIONS

This application is a National Stage of International Application No. PCT/JP2022/003854 filed Feb. 1, 2022, claiming priority based on Japanese Patent Application No. 2021-051351 filed Mar. 25, 2021.

TECHNICAL FIELD

The present disclosure relates to a technique for testing being conducted with specimens collected from animals.

BACKGROUND ART

Testing using specimens collected from humans or other animals are conducted. For example, Patent Literature 1 discloses a method of conducting a genetic test on a fetus using blood of a pregnant woman including cell fragments from the pregnant woman and cell fragments from the fetus. Here, as a method of determining the number of slides to be used for the test, Patent Literature 1 discloses a method of including, in a fixed cost or a variable cost, a distribution, an expected value, and a variance of the number of fetus-derived cells that can be collected from the slides and the cost for preparing the slides.

CITATION LIST

Patent Literature

Patent Literature 1: Japanese Unexamined Patent Application Publication No. 2016-049078

Non Patent Literature

Non Patent Literature 1: Guidelines for Handling Genomic Diagnostic Pathology Tissue Specimens, [online] Mar. 1, 2018, The Japanese Society of Pathology, Internet <URL: http://pathology.or.jp/genome_med/pdf/textbook.pdf>

SUMMARY OF INVENTION

Technical Problem

Patent Literature 1 discloses a test using blood. Thus, Patent Literature 1 does not mention a method of determining the number of slides needed for a test using a tissue piece, such as a part of a tumor. The present disclosure has been made in view of this problem, and an object thereof is to provide a technique for improving the efficiency of a test using pieces of animal tissue.

Solution to Problem

A slide number estimation apparatus according to the present disclosure includes: acquisition means for acquiring a slide image, the slide image being an image of a specimen slide obtained from a tissue piece of a subject; first estimation means for estimating a number of tumor cells included in a region of interest of the specimen slide using the slide image; and second estimation means for estimating a number of the specimen slides to be obtained from the tissue piece for conducting a predetermined test, based on the estimated number of tumor cells.

A control method according to the present disclosure is executed by a computer. The control method includes: an acquisition step of acquiring a slide image, the slide image being an image of a specimen slide obtained from a tissue piece of a subject; a first estimation step of estimating a number of tumor cells included in a region of interest of the specimen slide using the slide image; and a second estimation step of estimating a number of the specimen slides to be obtained from the tissue piece for conducting a predetermined test, based on the estimated number of tumor cells.

A computer readable medium according to the present disclosure stores a program for causing a computer to execute the control method of the present disclosure.

Advantageous Effects of Invention

The present disclosure provides a technique for improving the efficiency of a test using pieces of animal tissue.

EXAMPLE EMBODIMENT

Example embodiments of the present disclosure will be described in detail below with reference to the drawings. In each drawing, the same or corresponding elements are denoted by the same reference signs, and repeated descriptions will be omitted as necessary for clarity. Unless otherwise explained, predefined values such as predetermined values and thresholds are stored in advance in a storage device accessible from an apparatus utilizing the values.

Figure 1:
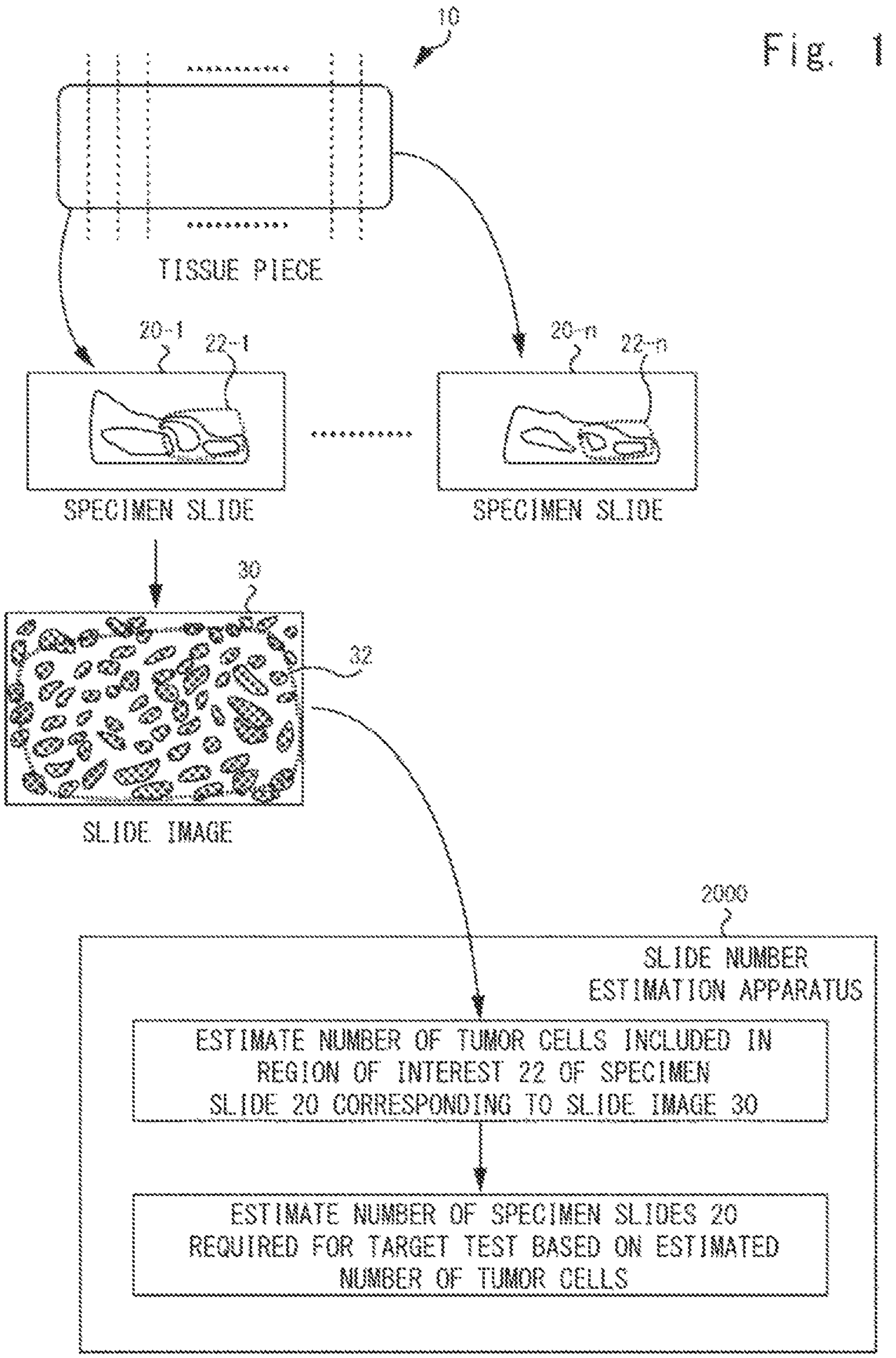
FIG. 1 shows an example of an overview of an operation of a slide number estimation apparatus according to a first example embodiment.

FIG. 1 shows an overview of an operation of a slide number estimation apparatus 2000 according to a first example embodiment. FIG. 1 is a diagram for facilitating understanding of an overview of the slide number estimation apparatus 2000, and the operation of the slide number estimation apparatus 2000 is not limited to that shown in FIG. 1.

A tissue piece 10 is a piece of tissue (e.g., part of a tumor in a body) collected by a specified method from a body of a person or other animal undergoing a predetermined test. Hereinafter, the predetermined test is referred to as a "target test" and the person undergoing the target test is referred to as a "subject". In the target test, slides (specimen slides 20) of a tissue specimen cut out of the tissue piece 10 are prepared, and a test is conducted using the specimen slides 20. In FIG. 1, n specimen slides 20 named 20-1 to 20-*n* are prepared from the tissue piece 10. When the specimen slides 20 are cut out of the tissue piece 10, it is assumed that formalin fixation or the like is performed on the tissue piece 10 in advance.

Here, in the target test, it is required that a predetermined amount or more of a predetermined substance (hereinafter referred to as a target substance) included in the subject's tumor cells. Therefore, it is necessary to have a sufficient number of specimen slides 20 to obtain the predetermined amount or more of the target substance. For example, a certain amount of DNA must be obtained from tumor cells in order to conduct a gene panel test. Thus, gene panel tests require a sufficient number of specimen slides with which a necessary amount of DNA can be acquired.

For this reason, the slide number estimation apparatus 2000 uses one or more slide images 30, which are images of the specimen slides 20, to estimate the sufficient number of specimen slides 20 (i.e., the number of specimen slides 20 required to obtain the necessary amount or more of the target substance) that should be obtained from the tissue piece 10 for the target test. Hereinafter, the number of specimen slides 20 that should be obtained from the tissue piece 10 for the target test is also referred to as the "required number of specimen slides 20".

The slide image 30 is image data that is obtained by performing any type of scan on the specimen slide 20 that has been subjected to predetermined staining. Hereinafter, the specimen slide 20 scanned to obtain a certain slide image 30 is referred to as the "specimen slide 20 corresponding to the slide image 30". Similarly, the slide image 30 obtained by scanning a certain specimen slide 20 is referred to as the "slide image 30 corresponding to the specimen slide 20".

It is noted that the slide image 30 may be an image of a whole of the specimen slide 20 or an image of a part of the specimen slide 20. In the latter case, the slide image 30 includes, at least, an image region that indicates a region of interest 22 of the specimen slide 20. For example, in the example of FIG. 1, the slide image 30 is generated by applying a mark indicating the region of interest 22 to the specimen slide 20 in a specified manner and then scanning a region including the mark. The region of interest 22 may be set after the slide image 30 is prepared. That is, the mark indicating the region of interest 22 may be applied to the slide image 30 obtained by scanning the specimen slide 20 using image processing software or the like. Hereinafter, an image region indicating the region of interest 22 in the image region in the slide image 30 is referred to as a region-of-interest image 32. When the slide image 30 includes only the region of interest 22 of the corresponding specimen slide 20, the entire slide image 30 is handled as the region-of-interest image 32.

The slide number estimation apparatus 2000 estimates the number of tumor cells included in the region of interest 22 of the specimen slide 20 corresponding to the slide image 30 by analyzing the slide image 30. The slide number estimation apparatus 2000 estimates the required number of specimen slides 20 based on the estimated number of tumor cells.

Example of Advantageous Effect

According to the slide number estimation apparatus 2000 of this example embodiment, the number of tumor cells included in the region of interest 22 of the specimen slide 20 is estimated using the slide image 30 obtained by scanning the specimen slide 20. Based on the estimated number of tumor cells, the number of specimen slides 20 required for the target test is estimated. According to this method, it is not necessary to analyze the slide images 30 of all the specimen slides 20 obtained from the tissue piece 10. It is possible to know the number of specimen slides 20 required for the target test by analyzing some of the specimen slides 20 of the slide image 30. Therefore, it is possible to improve the efficiency of a test using the specimen slides 20.

In addition, regarding the specimen slide 20 to be used for the test, there may be cases in which it is difficult to know the number of tumor cells based on the slide image 30 corresponding to that specimen slide 20. This is because, while it is preferable to appropriately stain the specimen slides 20 in order to estimate the number of cells included in the specimen slides 20 by image analysis, there may be cases in which the specimen slides 20 stained in that way is not suitable as slides used for the test in some cases.

In this regard, in the slide number estimation apparatus 2000, only some of the specimen slides 20 obtained from the tissue piece 10 need to be stained, so that the specimen slide 20 to be used for a test can be preserved without being stained. Therefore, in the slide number estimation apparatus 2000, the number of the specimen slides 20 to be used for a test can be estimated even for a test in which it is difficult to use the stained specimen slide 20.

Hereinafter, the slide number estimation apparatus 2000 according to this example embodiment will be described in more detail.

Example of Functional Configuration

Figure 2:
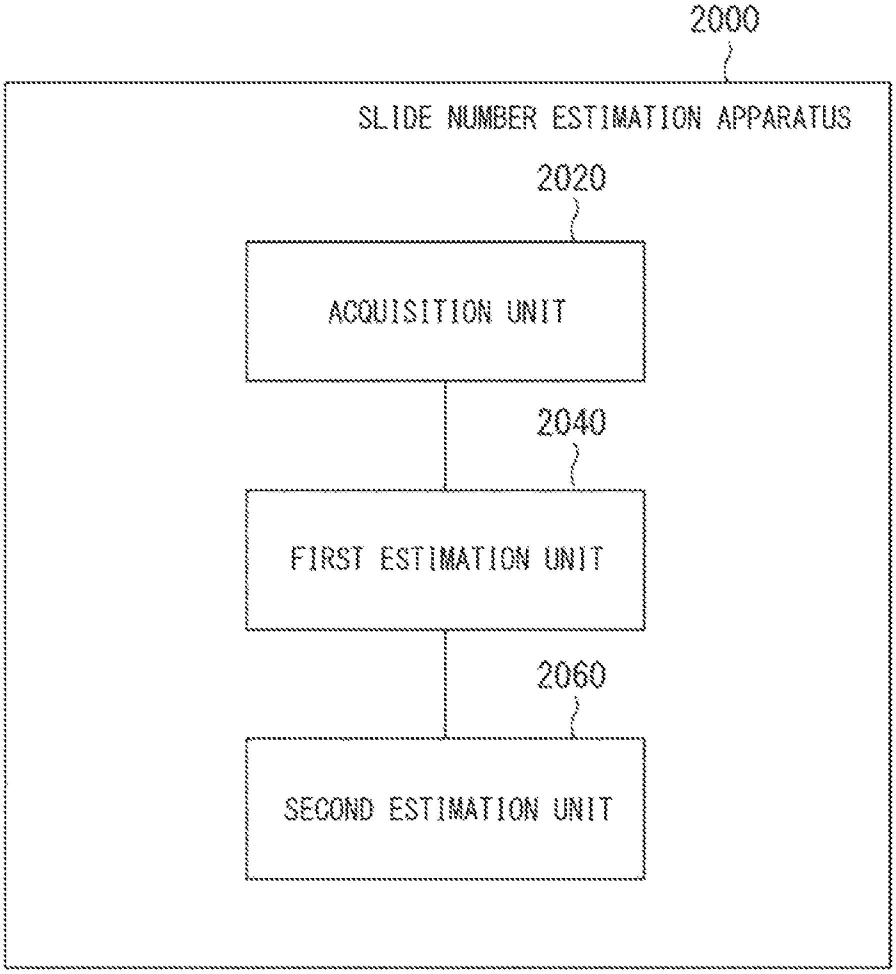
FIG. 2 is a block diagram showing an example of a functional configuration of the slide number estimation apparatus according to the first example embodiment.

FIG. 2 is a block diagram showing an example of a functional configuration of the slide number estimation apparatus 2000 according to the first example embodiment. The slide number estimation apparatus 2000 includes an acquisition unit 2020, a first estimation unit 2040, and a second estimation unit 2060. The acquisition unit 2020 acquires the slide image 30. The first estimation unit 2040 estimates the number of tumor cells included in the region of interest 22 of the specimen slide 20 corresponding to the slide image 30. The second estimation unit 2060 estimates the required number of the specimen slides 20 based on the estimated number of tumor cells.

Example of Hardware Configuration

Each of the functional components of the slide number estimation apparatus 2000 may be implemented by hardware (e.g., hardwired electronic circuit, etc.) that implements each functional component, or by a combination of hardware and software (e.g., combination of an electronic circuit and a program that controls it, etc.). The case where each of the functional components of the slide number estimation apparatus 2000 is implemented by a combination of hardware and software will be further described below.

Figure 3:
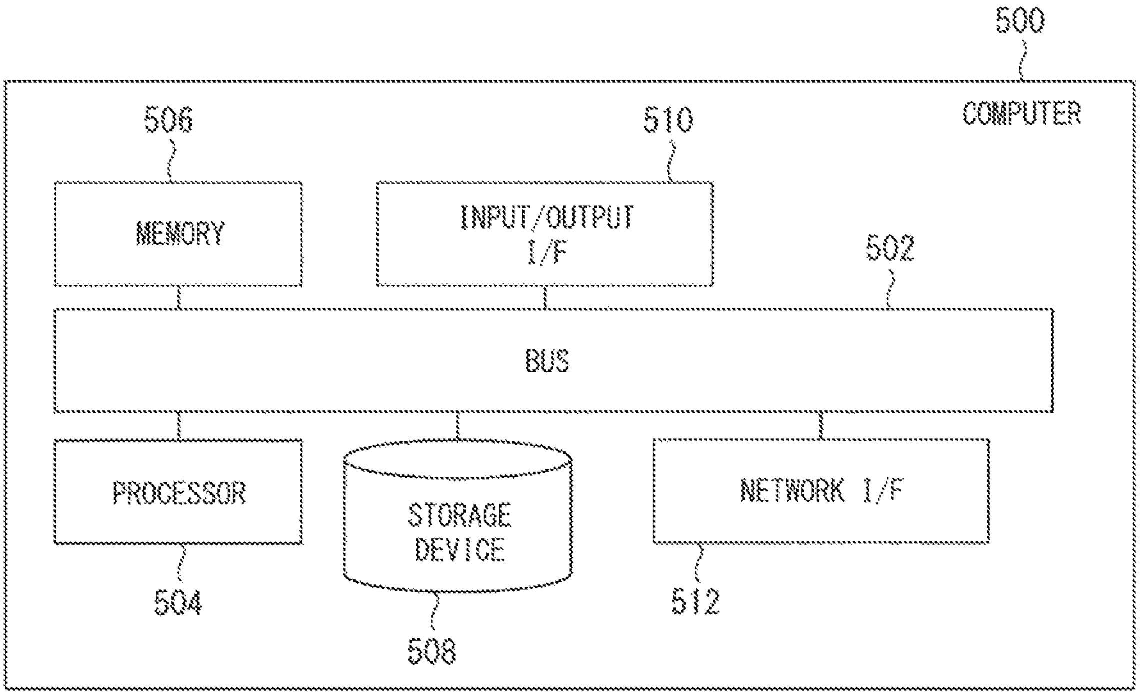
FIG. 3 is a block diagram showing an example of a hardware configuration of a computer implementing the slide number estimation apparatus.

FIG. 3 is a block diagram showing an example of a hardware configuration of a computer 500 for implementing the slide number estimation apparatus 2000. The computer 500 is any computer. For example, the computer 500 is a stationary computer such as a PC (Personal Computer) or a server machine. Alternatively, for example, the computer 500 is a portable computer such as a smartphone or a tablet terminal. The computer 500 may be a special purpose computer designed to implement the slide number estimation apparatus 2000 or a general purpose computer.

For example, each function of the slide number estimation apparatus 2000 is implemented by the computer 500 installing a predetermined application thereto. The above application is composed of a program for implementing functional components of the slide number estimation apparatus 2000. The method of acquiring the above program may be any method. For example, the program can be acquired from a storage medium (such as a DVD disc or USB memory) in which the program is stored. In addition, the program can be acquired, for example, by downloading the program from a server apparatus managing a memory device in which the program is stored.

The computer 500 has a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processors 504 and the like to each other is not limited to bus connection.

The processor 504 is one of various processors such as CPU (Central Processing Unit), GPU (Graphics Processing Unit), FPGA (Field-Programmable Gate Array), and DSP (Digital Signal Processor). The memory 506 is a primary memory device implemented using RAM (Random Access Memory) or the like. The storage device 508 is a secondary memory device implemented using a hard disk, SSD (Solid State Drive), memory card, ROM (Read Only Memory), or the like.

The input/output interface 510 is an interface for connecting the computer 500 to an input/output device. For example, an input apparatus such as a keyboard and an output device such as a display apparatus are connected to the input/output interface 510.

The network interface 512 is for connecting the computer 500 to a network. Note that this network may be a Local the area Network (LAN) or a Wide the area Network (WAN).

The storage device 508 stores programs (programs for implementing the applications described above) for implementing respective functional configuration units of the slide number estimation apparatus 2000. The processor 504 reads these programs into the memory 506 and executes them to implement the respective functional configuration units of the slide number estimation apparatus 2000.

The slide number estimation apparatus 2000 may be implemented by one computer 500 or by a plurality of the computers 500. In the latter case, the configuration of each computer 500 need not be identical and instead may be different from each other.

<Processing Flow>

Figure 4:
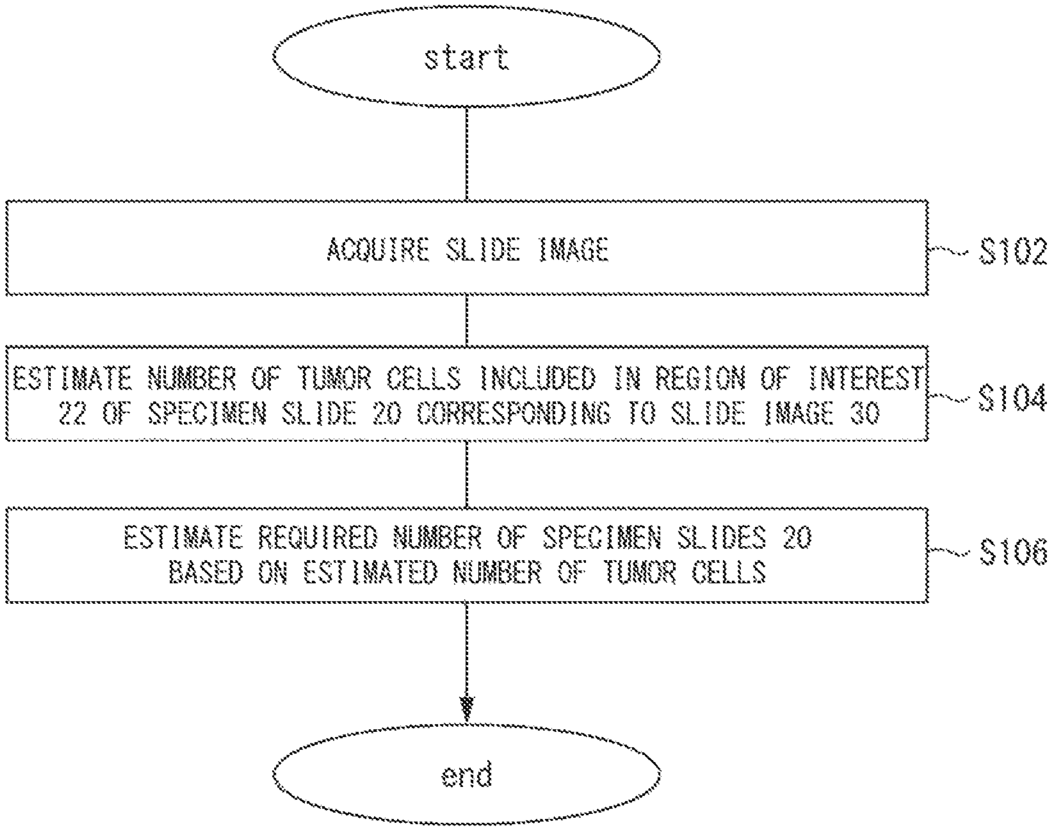
FIG. 4 is a flowchart showing an example of a flow of processing performed by the slide number estimation apparatus according to the first example embodiment.

FIG. 4 is a flowchart showing an example of a flow of processing executed by the slide number estimation apparatus 2000 according to the first example embodiment. The acquisition unit 2020 acquires the slide image 30 (S102). The first estimation unit 2040 estimates the number of tumor cells included in the region of interest 22 of the specimen slide 20 corresponding to the slide image 30 (S104). The second estimation unit 2060 estimates the required number of the specimen slides 20 based on the estimated number of tumor cells (S106).

<Acquisition of Slide Image 30: S102>

The acquisition unit 2020 acquires the slide image 30 (S102). The acquisition unit 2020 acquires the slide image 30 in various ways. For example, the acquisition unit 2020 acquires the slide image 30 stored in a storage device accessible from the slide number estimation apparatus 2000. For example, an apparatus (hereinafter, scanning apparatus) that scans the specimen slide 20 and then generates the slide image 30 puts the generated slide image 30 in the storage device. The acquisition unit 2020 acquires the slide image 30 desired by the user of the slide number estimation apparatus 2000 from the slide image 30 stored in the storage device. For example, the acquisition unit 2020 receives a user input for selecting a desired slide image out of the slide images 30 stored in the storage device, and acquires the slide image 30 selected by the user input. In addition, for example, the acquisition unit 2020 may acquire the slide image 30 by receiving the slide image 30 transmitted from another device (e.g., the aforementioned scanning apparatus).

<Estimation of the Number of Tumor Cells: S104>

The first estimation unit 2040 analyzes the slide image 30 to estimate the number of tumor cells included in the region of interest 22 of the specimen slide 20 corresponding to the slide image 30 (S104). For example, the first estimation unit 2040 detects cells from the region-of-interest image 32 in the slide image 30, and classifies each detected cell into a tumor cell or a normal cell. The first estimation unit 2040 then estimates the number of tumor cells by counting the number of cells classified as tumor cells.

For example, the first estimation unit 2040 has a model trained to detect cells from the region-of-interest image 32 (hereinafter referred to as a cell detection model) and a model trained to classify images of cells into either tumor cells or normal cells (hereinafter referred to as a cell type determination model). These models can be any type of model, such as a neural network or a support vector machine (SVM). Existing techniques can be used to train models to detect a predetermined type of object from an image. Existing techniques can also be used to train models to classify images of objects by object type.

When the first estimation unit 2040 inputs the slide image 30 to the cell detection model, an image of each cell included in the region-of-interest image 32 is obtained from the cell detection model. In addition, an image of each cell obtained from the cell detection model is input to the cell type determination model, so that it is determined whether each cell is a tumor cell or a normal cell. The first estimation unit 2040 computes the number of tumor cells by counting the number of cells determined to be tumor cells.

Instead of using two kinds of models, i.e., the cell detection model and the cell type determination model, one model trained to detect tumor cells from the region-of-interest image 32 may be used. Further, the number of tumor cells may be estimated without using the trained model.

<Estimation of the Number of Specimen Slides 20: S106>

The second estimation unit 2060 estimates the required number of specimen slides 20 based on the number of tumor cells estimated by the first estimation unit 2040 (S106). In the target test, it is necessary to obtain a predetermined amount or more of the target substance included in the subject's tumor cells. Therefore, the second estimation unit 2060 estimates the amount of the target substance included in the tumor cells included in the region of interest 22 of the specimen slide 20 corresponding to the slide image 30, based on the number of tumor cells estimated by the first estimation unit 2040. In other words, the second estimation unit 2060 estimates the amount of the target substance included in the tumor cells detected from the region-of-interest image 32 of the slide image 30. The second estimation unit 2060 then estimates the required number of specimen slides 20 based on the estimated amount of the target substance and the amount of the target substance required for the target test.

In a test in which DNA included in tumor cells is used, such as a gene panel test, the target substance is DNA. In this case, the second estimation unit 2060 estimates the amount of DNA obtained from the tumor cells from the number of the tumor cells detected from the region-of-interest image 32 of the slide image 30. Next, the second estimation unit 2060 estimates the required number of specimen slides 20 based on the estimated amount of DNA and the amount of DNA required for the target test.

For example, a predetermined conversion formula can be used to convert the number of tumor cells into the amount of the target substance. For example, Non Patent Literature has a description about the relationship between the number of tumor cells and the amount of DNA that "the DNA yield obtained from one nucleated cell is estimated to be about 6 pg". Therefore, the number of tumor cells can be converted into the amount of DNA based on this relationship.

The method of converting the number of tumor cells into the amount of the target substance is not limited to the method using the relationship between the number of tumor cells and the amount of the target substance disclosed in the literature. For example, the conversion formula from the number of tumor cells into the amount of the target substance may be prepared by conducting an experiment before the operation of the slide number estimation apparatus 2000. In addition, for example, a model (hereinafter referred to as a conversion model) trained to output the amount of the target substance included in the region of interest 22 in response to an input of the number of tumor cells included in the region of interest 22 of the specimen slide 20 may be used. Any regression model may be used for this conversion model.

The training of the conversion model is performed using a plurality of pieces of training data that includes a pair of input data and ground truth data (output data to be output from the model in response to an input of the corresponding input data). The input data indicates the number of tumor cells included in the region of interest 22. The ground truth data indicates the amount of the target substance included in the region of interest 22.

The second estimation unit 2060 computes the amount of the target substance included in the region of interest 22 of the specimen slide 20 corresponding to the slide image 30 based on the number of tumor cells estimated by the first estimation unit 2040 using the conversion formula or the conversion model described above. Further, the second estimation unit 2060 computes the required number of the specimen slides 20 based on the relationship between the computed amount of the target substance and the amount of the target substance required for the target test. Here, information indicating the amount of the target substance required for the target test is stored in advance in a storage unit accessible from the slide number estimation apparatus 2000.

For example, the second estimation unit 2060 computes the required number of specimen slides 20, under the assumption that the same amount of the target substance can be obtained from the regions of interest 22 regarding all specimen slides 20 obtained from the tissue piece 10. In this case, the required number of specimen slides 20 can be computed, for example, by the following Expression (1).

Expression 1

$$M = \left\lceil \frac{y}{f(x)} \right\rceil \tag{1}$$

In Expression (1), M represents the required number of specimen slides 20. y represents the amount of target substance required for the target test. The function f represents a conversion formula that converts the number of tumor cells into the amount of target substance. x represents the number of tumor cells estimated by the first estimation unit 2040. [ ] is a Gaussian symbol. That is, [a] represents the smallest integer greater than or equal to a.

In addition, for example, the second estimation unit 2060 may estimate the number of tumor cells included in the region of interest 22 of another specimen slide 20 from the number of tumor cells estimated for the specimen slide 20 corresponding to the slide image 30. In this case, the required number M of the specimen slides 20 is, for example, the smallest integer k satisfying the following Expression (2).

Expression 2

$$\sum_{i=2}^{k} f(x_i) \geq y \tag{2}$$

In Expression (2), i represents an identification number sequentially assigned to each specimen slide obtained from the tissue piece 10. x_i represents the number of tumor cells estimated to be included in the region of interest 22 of the specimen slide 20 with an identifier i (such specimen slide 20 is hereinafter referred to as a specimen slide 20-*i*). Note that the underbar of x_i represents a subscript.

Here, in Expression (2), i is set to two or more. This is because it is assumed that the specimen slide 20-1 is stained to obtain the slide image 30 and is not used for the target test.

The required number of the specimen slides 20 may be estimated based on the number of tumor cells estimated for the specimen slide 20 corresponding to the slide image 30 and the number of tumor cells required for the target test. For example, the number of tumor cells required for the target test is computed in advance by converting the amount of the target substance required for the target test into the number of tumor cells, and the computed number of tumor cells required for the target test is put in a storage device accessible from the slide number estimation apparatus 2000. This conversion can be performed, for example, by using the inverse function of the conversion formula f( ). Further, by reversing the relationship between the input data and the ground truth data in the training of the conversion model described above, it is possible to generate a conversion model that converts the amount of a predetermined substance into the number of tumor cells.

When denoting the number of tumor cells required for the target test by z, Expressions (1) and (2) can be replaced by Expressions (3) and (4), respectively.

[Expression 3]

$$M = \left\lceil \frac{z}{x} \right\rceil \tag{3}$$

-continued

[Expression 4]

$$\sum_{i=2}^{k} x_i \geq z \quad (4)$$

In order to estimate the required number of specimen slides 20 by the method described above, based on the number of tumor cells estimated for the region of interest 22 of the specimen slide 20 corresponding to the slide image 30, the second estimation unit 2060 estimates the number of tumor cells that are included in the region of interest 22 of each of the other specimen slides 20 obtained from the tissue piece 10. For this estimation, for example, a tumor cell number estimation model which has been trained is used. Any model, such as a neural network or SVM, can be used as the tumor cell number estimation model.

The tumor cell number estimation model outputs output data in response to an input of input data. The input data includes one or more pairs of "the slide image 30, and the number of tumor cells estimated for slide image 30". The output data indicates the number of tumor cells estimated to be included in the region of interest 22 in each of a plurality of specimen slides 20 obtained from the tissue piece 10, regarding the tissue piece 10 from which the slide image 30 included in the input data is obtained. When a plurality of slide images 30 are included in the input data, all of them obtained from the same tissue piece 10 are used.

Some more specific examples of the tumor cell number estimation models will be described below. Here, in the following description, it is assumed that n specimen slides 20 are cut out of the tissue pieces 10.

Figure 5:
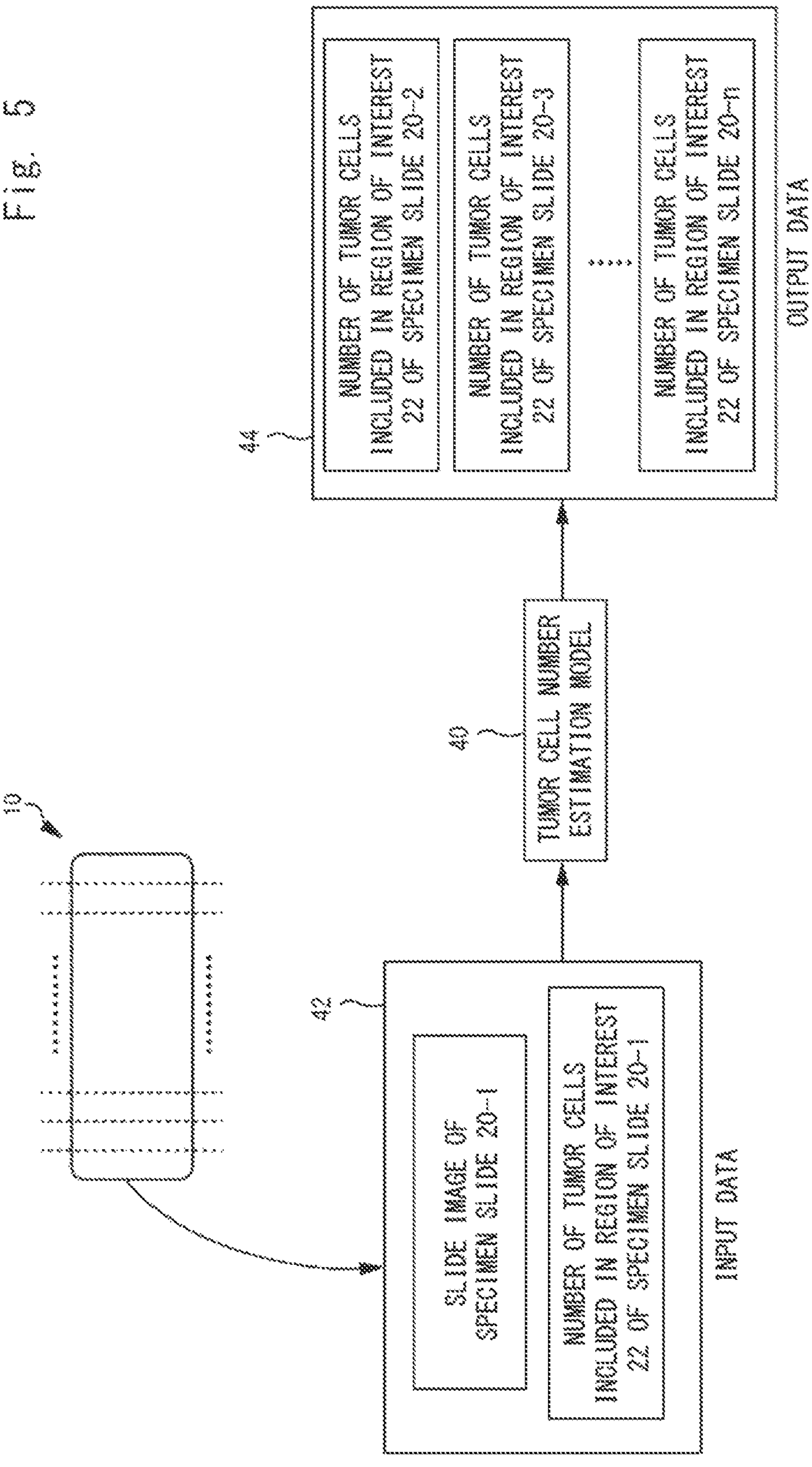
FIG. 5 shows a first specific example of a tumor cell number estimation model.

FIG. 5 shows a first specific example of the tumor cell number estimation model. Input data 42 input to a tumor cell number estimation model 40 of FIG. 5 includes a pair of "the slide image 30 of the specimen slide 20-1, and the number of tumor cells included in the region of interest 22 of the specimen slide 20-1". Output data 44 output from the tumor cell number estimation model 40 shown in FIG. 5 indicates the number of tumor cells estimated to be included in the region of interest 22 of the specimen slide 20 for each of n−1 specimen slides 20 other than the specimen slide 20 used in the input data 42.

Figure 6:
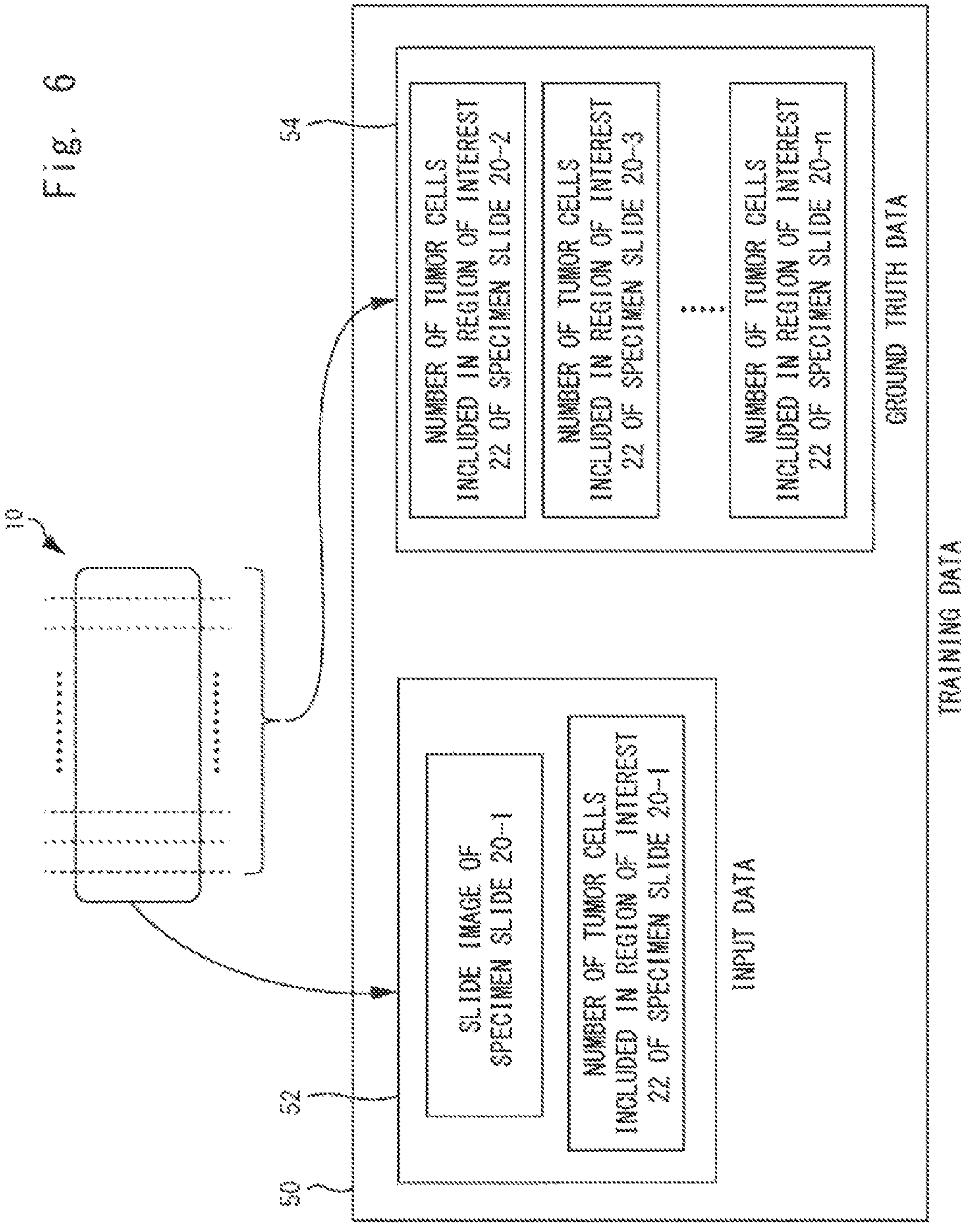
FIG. 6 shows the first specific example of training data used for training the tumor cell number estimation model.

The tumor cell number estimation model 40 of FIG. 5 is trained by using a plurality of pieces of training data composed of a pair of the input data and the ground truth data. One piece of the training data 50 is generated by using one tissue piece 10. FIG. 6 shows a first specific example of the training data that is used to train the tumor cell number estimation model 40. In FIG. 6, input data 52 includes a pair of a slide image of the specimen slide 20-1 cut out of the tissue piece 10 and the number of tumor cells included in the region of interest 22 of the specimen slide 20-1. Ground truth data 54 indicates the number of tumor cells included in the region of interest 22 of each of the specimen slides from the specimen slide 20-2 to the specimen slide 20-*n*.

Figure 7:
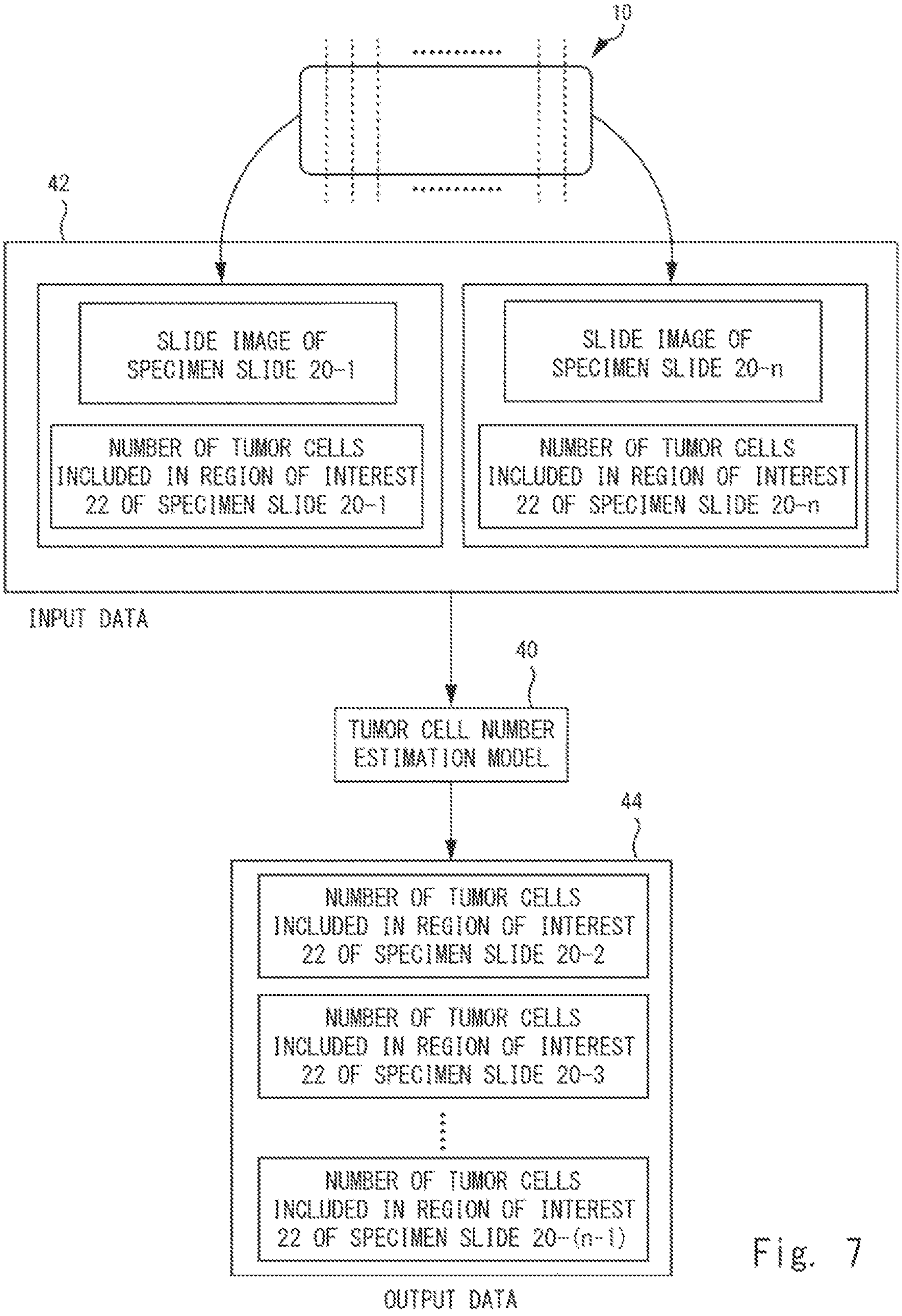
FIG. 7 shows a second specific example of the tumor cell number estimation model.

FIG. 7 shows a second specific example of the tumor cell number estimation model 40. The input data 42 input to the tumor cell number estimation model 40 shown in FIG. 7 includes two pairs of "the slide image 30, and the number of tumor cell number". The output data 44 output from the tumor cell number estimation model 40 shown in FIG. 7 indicates the number of tumor cells estimated to be included in the region of interest 22 of the specimen slide 20 for each of n−2 specimen slides 20 other than the specimen slide 20 used in the input data 42.

Each of the n−2 specimen slides 20 is a specimen slide 20 obtained from a part of the tissue piece 10 between the specimen slide 20 corresponding to the first pair of the slide images 30 in the input data 42 and the specimen slide 20 corresponding to the second pair of the slide images 30 in the input data. That is, the tumor cell number estimation model 40 of FIG. 7 estimates the number of tumor cells included in each specimen slide 20 between the specimen slides 20 consecutively cut out of the tissue piece 10, based on the images of the specimen slides 20 that are cut first and last and the number of tumor cells estimated for them.

Figure 8:
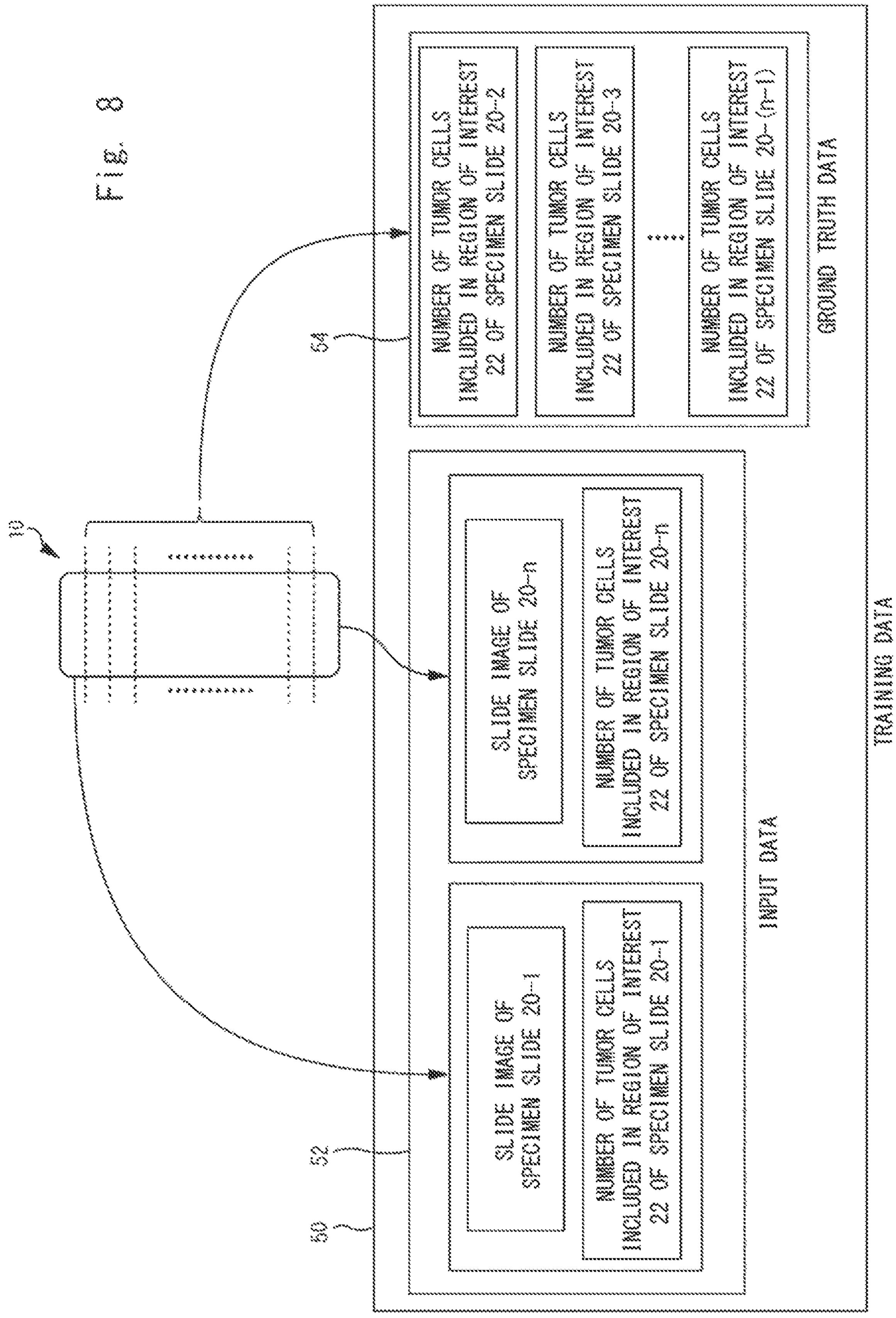
FIG. 8 shows the second specific example of training data used for training the tumor cell number estimation model.

FIG. 8 shows a second specific example of the training data 50 used for training the tumor cell number estimation model 40. The input data 52 is generated using the first and last specimen slides 20 of the n specimen slides 20 consecutively cut out of the tissue piece 10. That is, the first pair included in the input data 52 includes "the slide image of the specimen slide 20-1, and the number of tumor cells in the region of interest 22 of the specimen slide 20-1". The second pair included in the input data 52 includes "the slide image of the specimen slide 20-*n*, and the number of tumor cells in the region of interest 22 of the specimen slide 20-*n*". The ground truth data 54 indicates the number of tumor cells included in each region of interest 22 from the specimen slide 20-2 to the specimen slide 20-(*n*−1).

In the tumor cell number estimation model 40, n (the number of specimen slides 20 cut out of the tissue piece 10) may be fixed or input to the tumor cell number estimation model 40. In the latter case, the input data 42 and the input data 52 further include the number of specimen slides 20 to be cut out of the tissue piece 10.

The input data 42 and the input data 52 may further include additional information that is data other than the slide image 30 and the number of tumor cells. For example, the additional information may indicate one or more of the following: the shape of the region of interest 22 of the specimen slide 20 corresponding to the slide image 30, the size of the region of interest 22, the density of tumor cells in the region of interest 22, the distribution of tumor cells in the region of interest 22, the method by which the tissue piece 10 is collected, the type of organ including the tissue piece 10, and the tissue type of the tumor cells.

Instead of inputting the additional information to the tumor cell number estimation model 40, it is possible to prepare a different tumor cell number estimation model 40 for each value of the additional information. For example, different tumor cell number estimation models 40 are prepared for different methods of collecting the tissue pieces 10. In this case, the second estimation unit 2060 determines the tumor cell number estimation model 40 corresponding to the method of collecting the tissue pieces 10 indicated by the additional information from a plurality of the tumor cell number estimation models 40, and inputs the remaining data included in the input data 42 to the determined tumor cell number estimation model 40.

Instead of using the tumor cell number estimation model 40, an estimation model for estimating the amount of the target substance included in the region of interest 22 of each specimen slide 20 may be used. In this case, the ground truth data 54 of the training data 50 indicates the amount of the target substance included in the region of interest of each specimen slide 20 instead of indicating the number of tumor cells included in the region of interest of each specimen slide 20. The input data 42 and the input data 52 may indicate either the number of tumor cells included in the region of interest of the specimen slide 20 or the amount of the target substance.

The method of estimating the number of tumor cells included in each specimen slide 20 obtained from the tissue piece 10 is not limited to the method of utilizing the tumor cell number estimation model 40. For example, for n specimen slides 20 consecutively cut out of the tissue piece 10, a function representing the relationship between the numbers of tumor cells included in the regions of interest 22 of the n specimen slides 20 may be defined in advance. In this case, the second estimation unit 2060 uses the function to estimate the number of tumor cells included in each region of interest 22 of each of other specimen slides 20 from the number of tumor cells included in the regions of interest 22 of the specimen slides 20 corresponding to the slide images 30.

For example, it is assumed that the number of tumor cells varies linearly in the n specimen slides 20 that are consecutively cut out of tissue piece 10. In this case, it is assumed that the second estimation unit 2060 uses the number of tumor cells estimated for one slide image 30 to estimate the numbers of tumor cells included in the regions of interest 22 of other n−1 specimen slides 20. In this case, for example, the number of tumor cells included in the region of interest 22 of the specimen slide 20-*i* can be computed by the following Expression (5). Expression (5) is an expression to estimate, using the number b of tumor cells estimated for the slide image 30 of the specimen slide 20-1 cut out of an edge of the tissue piece 10, the number of tumor cells included in the region of interest 22 of each of other n−1 specimen slides 20.

$$num(i) = a*(i-1) + b$$

In Expression (5), num(i) represents the number of tumor cells included in the region of interest 22 of the specimen slide 20-*i*. a represents a non-zero real number representing an increase in the number of tumor cells between adjacent specimen slides 20. b represents the number of tumor cells included in the region of interest 22 of specimen slides 20-1 as estimated by the first estimation unit 2040.

In addition, for example, the second estimation unit 2060 estimates the number of tumor cells included in the region of interest 22 of the other n−2 specimen slides 20 using the number of tumor cells estimated for each of the two slide images 30. In this case, for example, the number of tumor cells included in the region of interest 22 of the specimen slide 20-*i* can be computed by the following Expression (6). Expression (6) is an expression to estimate the number of tumor cells included in the region of interest 22 of each of the n−2 specimen slides 20 positioned between the specimen slide 20-1 and the specimen slides 20-*n*, using the number of tumor cells b and c that are respectively estimated for the slide image 30 of the specimen slide 20-1 and the slide image 30 of the specimen slides 20-*n* cut out of the tissue piece 10.

Expression 6

$$num(i) = \frac{c-b}{n-1} * (i-1) + b \tag{6}$$

In the above description, it is assumed that the number of tumor cells changes linearly. However, the change in the number of tumor cells is not limited to a linear change and may be a nonlinear change. In this case, for example, by preparing a nonlinear template function and fitting the template function to the estimated number of tumor cells for one or more slide images 30, a function representing the change in the number of tumor cells is dynamically generated. The second estimation unit 2060 uses this function to estimate the number of tumor cells included in the region of interest 22 for the specimen slide 20 other than the specimen slide 20 corresponding to the slide image 30.

<Output by Slide Number Estimation Apparatus 2000>

The slide number estimation apparatus 2000 outputs information indicating the required number of specimen slides 20. Hereinafter, this information will be referred to as output information. The output information may be output in various manners. For example, the slide number estimation apparatus 2000 puts the output information in any storage device accessible from the slide number estimation apparatus 2000. Alternatively, for example, the slide number estimation apparatus 2000 displays the output information on a display apparatus accessible from the slide number estimation apparatus 2000. Further alternatively, for example, the slide number estimation apparatus 2000 may transmit the output information to any device accessible from the slide number estimation apparatus 2000.

The output information may include information other than the required number of specimen slides 20. For example, this information indicates which specimen slide 20 of the n specimen slides 20 cut out of the tissue piece 10 should be used for the target test. For example, if the required number of specimen slides 20 is M, the specimen slides 20 that should be used for the target test are the top M specimen slides 20 in the order of the number of tumor cells are. Thus, for example, the output information includes information indicating identifiers of the M specimen slides 20.

Here, even if all the specimen slides 20 obtained from the tissue piece 10 are used, it is possible that a sufficient amount of the target substance required for the target test cannot be obtained. This happens when, for example, the value of M computed by Expression (1) or the value of k satisfying Expression (2) exceeds n, which is the number of specimen slides 20 cut out of the tissue piece 10. In such a case, the slide number estimation apparatus 2000 may output a message indicating that the required amount of the target substance cannot be obtained from the tissue piece 10. For example, a message "The required amount of DNA cannot be obtained from the current specimen only" or "An additional specimen is required" may be output.

Although the present disclosure has been described with reference to the above example embodiments, the present disclosure is not limited to the above example embodiments. Various changes can be made in the configurations and details of the present disclosure that can be understood by a person skilled in the art within the scope of the present disclosure.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the example embodiments disclosed above can be described as, but not limited to, the following supplementary notes.

Supplementary Note 1

A slide number estimation apparatus comprising:
acquisition means for acquiring a slide image, the slide image being an image of a specimen slide obtained from a tissue piece of a subject;
first estimation means for estimating a number of tumor cells included in a region of interest of the specimen slide using the slide image; and
second estimation means for estimating a number of the specimen slides to be obtained from the tissue piece for conducting a predetermined test, based on the estimated number of tumor cells.

Supplementary Note 2

The slide number estimation apparatus according to supplementary note 1,
wherein the second estimation means estimates a number of tumor cells included in the region of interest for each of a plurality of the specimen slides other than the specimen slide from which the slide image is obtained among the plurality of the specimen slides obtained from the tissue piece, and
wherein the second estimation means estimates the number of specimen slides to be obtained from the tissue piece based on the number of tumor cells estimated for the region of interest of each of the specimen slides.

Supplementary Note 3

The slide number estimation apparatus according to supplementary note 2,
wherein the acquisition means acquires the slide image of a first specimen slide and the slide image of a second specimen slide,
wherein the first estimation means estimates a number of tumor cells included in each of the region of interest of the first specimen slide and the region of interest of the second specimen slide, and
wherein the second estimation means estimates the number of tumor cells included in the region of interest of each of the plurality of the specimen slides obtained from a part of the tissue piece between the first specimen slide and the second specimen slide.

Supplementary Note 4

The slide number estimation apparatus according to supplementary note 2 or 3,
wherein the second estimation means has a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and
wherein the second estimation means inputs the obtained slide image and the estimated number of tumor cells to the model to estimate the number of specimen slides to be obtained from the tissue piece using the output data obtained from the model in response to the input.

Supplementary Note 5

The slide number estimation apparatus according to supplementary note 4,
wherein the input data further comprises information representing any one or more of a shape of the region of interest, a size of the region of interest, a density of the tumor cells in the region of interest, a distribution of the tumor cells in the region of interest, a method by which the tissue piece is collected, a type of organ including the tissue piece, and a tissue type of the tumor cells.

Supplementary Note 6

The slide number estimation apparatus according to any one of supplementary notes 1 to 5,
wherein the second estimation means performs:
estimating an amount of a predetermined substance included in the region of interest from the estimated number of tumor cells; and
estimating the number of specimen slides to be obtained from the tissue piece based on the estimated amount of the predetermined substance and the amount of the predetermined substance required for the predetermined test.

Supplementary Note 7

The slide number estimation apparatus according to supplementary note 6,
wherein the predetermined test is a gene panel test, and
wherein the predetermined substance is DNA.

Supplementary Note 8

A control method executed by a computer, comprising:
an acquisition step of acquiring a slide image, the slide image being an image of a specimen slide obtained from a tissue piece of a subject;
a first estimation step of estimating a number of tumor cells included in a region of interest of the specimen slide using the slide image; and
a second estimation step of estimating a number of the specimen slides to be obtained from the tissue piece for conducting a predetermined test, based on the estimated number of tumor cells.

Supplementary Note 9

The control method according to supplementary note 8,
wherein in the second estimation step, estimating a number of tumor cells included in the region of interest for each of a plurality of the specimen slides other than the specimen slide from which the slide image is obtained among the plurality of the specimen slides obtained from the tissue piece, and wherein in the second estimation step, estimating the number of specimen slides to be obtained from the tissue piece is estimated based on the number of tumor cells estimated for the region of interest of each of the specimen slides.

Supplementary Note 10

The control method according to supplementary note 9, wherein in the acquisition step, acquiring the slide image of a first specimen slide and the slide image of a second specimen slide, wherein in the first estimation means, estimating a number of tumor cells included in each of the region of interest of the first specimen slide and the region of interest of the second specimen slide, and wherein in the second estimation step, estimating the number of tumor cells included in the region of interest for each of the plurality of the specimen slides obtained from a part of the tissue piece between the first specimen slide and the second specimen slide.

Supplementary Note 11

The control method according to supplementary note 9 or 10, wherein the computer includes a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and wherein in the second estimation step, inputting the obtained slide image and the estimated number of tumor cells to the model to estimate the number of specimen slides to be obtained from the tissue piece is estimated using the output data obtained from the model in response to the input.

Supplementary Note 12

The control method according to supplementary note 11, wherein the input data further comprises information representing any one or more of a shape of the region of interest, a size of the region of interest, a density of the tumor cells in the region of interest, a distribution of the tumor cells in the region of interest, a method by which the tissue piece is collected, a type of organ including the tissue piece, and a tissue type of the tumor cells.

Supplementary Note 13

The control method according to any one of supplementary notes 8 to 12, wherein in the second estimation step, performing:

estimating an amount of a predetermined substance included in the region of interest from the estimated number of tumor cells; and estimating the number of specimen slides to be obtained from the tissue piece based on the estimated amount of the predetermined substance and the amount of the predetermined substance required for the predetermined test.

Supplementary Note 14

The control method according to supplementary note 13, wherein the predetermined test is a gene panel test, and wherein the predetermined substance is DNA.

Supplementary Note 15

A non-transitory computer readable medium storing a program that causes a computer to execute:

an acquisition step of acquiring a slide image, the slide image being an image of a specimen slide obtained from a tissue piece of a subject;

a first estimation step of estimating a number of tumor cells included in a region of interest of the specimen slide using the slide image; and a second estimation step of estimating a number of the specimen slides to be obtained from the tissue piece for conducting a predetermined test, based on the estimated number of tumor cells.

Supplementary Note 16

The computer readable medium according to supplementary note 15, wherein in the second estimation step, estimating the number of tumor cells included in the region of interest for each of a plurality of the specimen slides other than the specimen slide from which the slide image is obtained among the plurality of the specimen slides obtained from the tissue piece, and wherein in the second estimation step, estimating the number of specimen slides to be obtained from the tissue piece is estimated based on the number of tumor cells estimated for the region of interest of each of the specimen slides.

Supplementary Note 17

The computer readable medium according to supplementary note 16, wherein in the acquisition step, acquiring the slide image of a first specimen slide and the slide image of a second specimen slide, wherein in the first estimation means, estimating a number of tumor cells included in each of the region of interest of the first specimen slide and the region of interest of the second specimen slide, and wherein in the second estimation step, estimating the number of tumor cells included in the region of interest for each of the plurality of the specimen slides obtained from a part of the tissue piece between the first specimen slide and the second specimen slide.

Supplementary Note 18

The computer readable medium according to supplementary note 16 or 17, wherein the program includes a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and wherein in the second estimation step, inputting the obtained slide image and the estimated number of tumor cells to the model to estimate the number of specimen slides to be obtained from the tissue piece is estimated using the output data obtained from the model in response to the input.

Supplementary Note 19

The computer readable medium according to supplementary note 18, wherein the input data further comprises information representing any one or more of a shape of the region of interest, a size of the region of interest, a density of the tumor cells in the region of interest, a distribution of the tumor cells in the region of interest, a method by which the tissue piece is collected, a type of organ including the tissue piece, and a tissue type of the tumor cells.

Supplementary Note 20

The computer readable medium according to any one of supplementary notes 15 to 19, wherein in the second estimation step, performing:

estimating an amount of a predetermined substance included in the region of interest from the estimated number of tumor cells; and estimating the number of specimen slides to be obtained from the tissue piece based on the estimated amount of the predetermined substance and the amount of the predetermined substance required for the predetermined test.

Supplementary Note 21

The computer readable medium according to supplementary note 20, wherein the predetermined test is a gene panel test, and wherein the predetermined substance is DNA.

This application claims priority on the basis of Japanese Patent Application No. 2021-051351, filed Mar. 25, 2021, the entire disclosure of which is incorporated herein by reference.

REFERENCE SIGNS LIST

10 TISSUE PIECE
20 SPECIMEN SLIDE
22 REGION OF INTEREST
30 SLIDE IMAGE
32 REGION-OF-INTEREST IMAGE
40 TUMOR CELL NUMBER ESTIMATION MODEL
42 INPUT DATA
44 OUTPUT DATA
50 TRAINING DATA
52 INPUT DATA
54 GROUND TRUTH DATA
500 COMPUTER
502 BUS
504 PROCESSOR
506 MEMORY
508 STORAGE DEVICE
510 INPUT/OUTPUT INTERFACE
512 NETWORK INTERFACE
2000 SLIDE NUMBER ESTIMATION APPARATUS
2020 ACQUISITION UNIT
2040 FIRST ESTIMATION UNIT
2060 SECOND ESTIMATION UNIT

The invention claimed is:

1. A slide number estimation apparatus comprising:

at least one memory that is configured to store instructions; and at least one processor that is configured to execute the instructions to:

acquire a slide image, the slide image being an image of a specimen slide obtained from a tissue piece of a subject;

estimating a number of tumor cells included in a region of interest of the specimen slide using the slide image; and estimating a number of the specimen slides to be obtained from the tissue piece for conducting a predetermined test, based on the estimated number of tumor cells, wherein the at least one processor is configured to execute the instructions further to:

estimate a number of tumor cells included in the region of interest for each of a plurality of the specimen slides other than the specimen slide from which the slide image is obtained among the plurality of the specimen slides obtained from the tissue piece; and estimate the number of specimen slides to be obtained from the tissue piece based on the number of tumor cells estimated for the region of interest of each of the specimen slides, wherein the at least one memory is configured to further store a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and wherein the at least one processor is configured to execute the instructions further to input the obtained slide image and the estimated number of tumor cells to the model to estimate the number of specimen slides to be obtained from the tissue piece using the output data obtained from the model in response to the input.

2. The slide number estimation apparatus according to claim 1, wherein the at least one processor is configured to execute the instructions further to:

acquire the slide image of a first specimen slide and the slide image of a second specimen slide;

estimate a number of tumor cells included in each of the region of interest of the first specimen slide and the region of interest of the second specimen slide; and estimate the number of tumor cells included in the region of interest of each of the plurality of the specimen slides obtained from a part of the tissue piece between the first specimen slide and the second specimen slide.

3. The slide number estimation apparatus according to claim 1, wherein the input data further comprises information representing a shape of the region of interest, a size of the region of interest, a density of the tumor cells in the region of interest, a distribution of the tumor cells in the region of interest, a method by which the tissue piece is collected, a type of organ including the tissue piece, a tissue type of the tumor cells, or any combination thereof.

4. The slide number estimation apparatus according to claim 1, wherein the at least one processor is configured to execute the instructions further to:

estimate an amount of a predetermined substance included in the region of interest from the estimated number of tumor cells; and estimate the number of specimen slides to be obtained from the tissue piece based on the estimated amount of the predetermined substance and the amount of the predetermined substance required for the predetermined test.

5. The slide number estimation apparatus according to claim 4, wherein the predetermined test is a gene panel test, and wherein the predetermined substance is DNA.

6. A control method executed by a computer, comprising:

acquiring a slide image, the slide image being an image of a specimen slide obtained from a tissue piece of a subject;

estimating a number of tumor cells included in a region of interest of the specimen slide using the slide image; and estimating a number of the specimen slides to be obtained from the tissue piece for conducting a predetermined test, based on the estimated number of tumor cells, wherein the control method further comprises:

estimating a number of tumor cells included in the region of interest for each of a plurality of the specimen slides other than the specimen slide from which the slide image is obtained among the plurality of the specimen slides obtained from the tissue piece; and estimating the number of specimen slides to be obtained from the tissue piece is estimated based on the number of tumor cells estimated for the region of interest of each of the specimen slides, wherein the computer includes a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and wherein the control method further comprises inputting the obtained slide image and the estimated number of tumor cells to the model to estimate the number of specimen slides to be obtained from the tissue piece is estimated using the output data obtained from the model in response to the input.

7. The control method according to claim 6, further comprising:

acquiring the slide image of a first specimen slide and the slide image of a second specimen slide;

estimating a number of tumor cells included in each of the region of interest of the first specimen slide and the region of interest of the second specimen slide; and estimating the number of tumor cells included in the region of interest for each of the plurality of the specimen slides obtained from a part of the tissue piece between the first specimen slide and the second specimen slide.

8. The control method according to claim 6, wherein the input data further comprises information representing a shape of the region of interest, a size of the region of interest, a density of the tumor cells in the region of interest, a distribution of the tumor cells in the region of interest, a method by which the tissue piece is collected, a type of organ including the tissue piece, a tissue type of the tumor cells, or any combination thereof.

9. The control method according to claim 6, further comprising:

estimating an amount of a predetermined substance included in the region of interest from the estimated number of tumor cells; and estimating the number of specimen slides to be obtained from the tissue piece based on the estimated amount of the predetermined substance and the amount of the predetermined substance required for the predetermined test.

10. The control method according to claim 9, wherein the predetermined test is a gene panel test, and wherein the predetermined substance is DNA.

11. A non-transitory computer readable medium storing a program that causes a computer to execute:

acquiring a slide image, the slide image being an image of a specimen slide obtained from a tissue piece of a subject;

estimating a number of tumor cells included in a region of interest of the specimen slide using the slide image; and estimating a number of the specimen slides to be obtained from the tissue piece for conducting a predetermined test, based on the estimated number of tumor cells, wherein the program causes the computer to further execute:

estimating the number of tumor cells included in the region of interest for each of a plurality of the specimen slides other than the specimen slide from which the slide image is obtained among the plurality of the specimen slides obtained from the tissue piece; and estimating the number of specimen slides to be obtained from the tissue piece is estimated based on the number of tumor cells estimated for the region of interest of each of the specimen slides, wherein the program includes a model that is trained to output, in response to an input of input data indicating the image of the specimen slide and the number of tumor cells included in the region of interest of the specimen slide, output data indicating the number of tumor cells included in the region of interest for each of the specimen slides other than the specimen slide from which the slide image is obtained, among the plurality of the specimen slides obtained from the tissue piece, and wherein the program causes the computer to further execute inputting the obtained slide image and the estimated number of tumor cells to the model to estimate the number of specimen slides to be obtained from the tissue piece is estimated using the output data obtained from the model in response to the input.

12. The computer readable medium according to claim 11, wherein the program causes the computer to further execute:

acquiring the slide image of a first specimen slide and the slide image of a second specimen slide;

estimating a number of tumor cells included in each of the region of interest of the first specimen slide and the region of interest of the second specimen slide; and estimating the number of tumor cells included in the region of interest for each of the plurality of the specimen slides obtained from a part of the tissue piece between the first specimen slide and the second specimen slide.

13. The computer readable medium according to claim 11, wherein the input data further comprises information representing a shape of the region of interest, a size of the region of interest, a density of the tumor cells in the region of interest, a distribution of the tumor cells in the region of interest, a method by which the tissue piece is collected, a type of organ including the tissue piece, a tissue type of the tumor cells, or any combination thereof.

14. The computer readable medium according to claim 11, wherein the program causes the computer to further execute:

estimating an amount of a predetermined substance included in the region of interest from the estimated number of tumor cells; and estimating the number of specimen slides to be obtained from the tissue piece based on the estimated amount of the predetermined substance and the amount of the predetermined substance required for the predetermined test.

* * * * *